(12) United States Patent
Biswas

(10) Patent No.: US 12,205,581 B2
(45) Date of Patent: Jan. 21, 2025

(54) SPEECH/DIALOG ENHANCEMENT CONTROLLED BY PUPILLOMETRY

(71) Applicant: Dolby International AB, Amsterdam Zuidoost (NL)

(72) Inventor: Arijit Biswas, Schwaig bei Nuernberg (NL)

(73) Assignee: Dolby International AB, Dublin (IE)

( * ) Notice: Subject to any disclaimer, the term of this patent is extended or adjusted under 35 U.S.C. 154(b) by 733 days.

(21) Appl. No.: 17/213,088

(22) Filed: Mar. 25, 2021

(65) Prior Publication Data

US 2021/0264928 A1   Aug. 26, 2021

Related U.S. Application Data

(63) Continuation of application No. 15/998,796, filed on Aug. 16, 2018, now abandoned.
(Continued)

(51) Int. Cl.
*G10L 15/22*  (2006.01)
*G06F 3/01*  (2006.01)
(Continued)

(52) U.S. Cl.
CPC ............. *G10L 15/22* (2013.01); *G06F 3/013* (2013.01); *G06F 3/167* (2013.01); *G06T 19/006* (2013.01);
(Continued)

(58) Field of Classification Search
CPC ......... G10L 15/22; G10L 15/24; G10L 19/02; G10L 21/02; G10L 21/0364; G10L 25/78;
(Continued)

(56) References Cited

U.S. PATENT DOCUMENTS 7,941,318 B2 *  5/2011  Lu ........................... G10L 15/24
                                                704/274
9,313,585 B2 *  4/2016  Lunner ................ H04R 25/505
(Continued)

FOREIGN PATENT DOCUMENTS

EP        2200347           6/2010
KR   20170045149 A  *  4/2017  ............... G06F 3/01
(Continued)

OTHER PUBLICATIONS

Haapalainen, E. et al. "Psycho-Physiological Measures for Assessing Cognitive Load", UbiComp 10, Sep. 26-Sep. 29, 2010, Copenhagen, Denmark., pp. 301-310.
(Continued)

*Primary Examiner* — Richemond Dorvil
*Assistant Examiner* — Nadira Sultana

(57)  ABSTRACT

The present disclosure relates to methods for processing a decoded audio signal and for selectively applying speech/dialog enhancement to the decoded audio signal. The present disclosure also relates to a method of operating a headset for computer-mediated reality. A method of processing a decoded audio signal comprises obtaining a measure of a cognitive load of a listener that listens to a rendering of the audio signal, determining whether speech/dialog enhancement shall be applied based on the obtained measure of the cognitive load, and performing speech/dialog enhancement based on the determination. A method of operating a headset for computer-mediated reality comprises obtaining eye-tracking data of a wearer of the headset, determining a measure of a cognitive load of the wearer of the headset based on the eye-tracking data, and outputting an indication of the cognitive load of the wearer of the headset. The present disclosure further relates to corresponding apparatus
(Continued)

and systems, and to methods of operating such apparatus and systems.

17 Claims, 5 Drawing Sheets

Related U.S. Application Data

(60) Provisional application No. 62/546,640, filed on Aug. 17, 2017.

(51) Int. Cl.
    *G06F 3/16* (2006.01)
    *G06T 19/00* (2011.01)
    *G10L 15/24* (2013.01)
    *G10L 19/02* (2013.01)
    *G10L 21/02* (2013.01)
    *G10L 21/0364* (2013.01)
    *G10L 25/78* (2013.01)

(52) U.S. Cl.
    CPC .............. *G10L 15/24* (2013.01); *G10L 19/02* (2013.01); *G10L 21/02* (2013.01); *G10L 21/0364* (2013.01); *G10L 25/78* (2013.01); *G10L 2015/227* (2013.01)

(58) Field of Classification Search
    CPC ... G10L 2015/227; G06F 3/013; G06F 3/167; G06F 3/165; G06F 3/01; G06T 19/006
    See application file for complete search history.

(56) References Cited

U.S. PATENT DOCUMENTS

| | | | |
|---|---|---|---|
| 9,779,686 B2 | 10/2017 | Richards | |
| 9,953,650 B1* | 4/2018 | Falevsky | G06F 3/013 |
| 10,242,501 B1* | 3/2019 | Pusch | H04N 21/44218 |
| 10,405,786 B2* | 9/2019 | Sahin | A61B 7/04 |
| 10,539,787 B2* | 1/2020 | Haddick | G06F 3/0428 |
| 10,555,106 B1* | 2/2020 | Mehra | G06F 3/165 |
| 2009/0089062 A1 | 4/2009 | Lu | |
| 2010/0196861 A1 | 8/2010 | Lunner | |
| 2013/0293844 A1 | 11/2013 | Gross | |
| 2014/0146987 A1 | 5/2014 | Pontoppidan | |
| 2016/0261962 A1 | 9/2016 | Petersen | |
| 2017/0109513 A1 | 4/2017 | Skogö | |
| 2017/0115742 A1* | 4/2017 | Xing | G06F 3/0485 |
| 2017/0123526 A1 | 5/2017 | Trail | |
| 2017/0156589 A1 | 6/2017 | Wu | |
| 2017/0169790 A1 | 6/2017 | Richards | |
| 2017/0319123 A1 | 11/2017 | Voss | |
| 2018/0160236 A1* | 6/2018 | Biswas | H04R 25/353 |
| 2018/0357038 A1* | 12/2018 | Olivieri | H04S 7/303 |

FOREIGN PATENT DOCUMENTS

| | | |
|---|---|---|
| WO | 2007000030 | 1/2007 |
| WO | 2016115053 | 7/2016 |

OTHER PUBLICATIONS

Kramer, S.E. et al. "Assessing Aspect of Hearing Handicap by Means of Pupil Dilation" Audiology 36, pp. 155-164, vol. 36, 1997, Issue 3.

Kun, A. et al. "On the Feasibility of Using Pupil Diameter to Estimate Cognitive Load Changes for In-Vehicle Spoken Dialogues", pp. 1-5.

Zekveld, A. et al., "pupil response as an indication of effortful listening: the influence of sentence intelligibility", Ear and Hearing: official journal of the American auditory soc, Lippincott Williams & Wilkins: Wolters Kluwer Health, US, vol. 31, No. 4, Aug. 1, 2010, pp. 480-490.

* cited by examiner

SPEECH/DIALOG ENHANCEMENT CONTROLLED BY PUPILLOMETRY

CROSS-REFERENCE TO RELATED APPLICATION(S)

The present application is a continuation of U.S. patent application Ser. No. 15/998,796, filed Aug. 16, 2018, which claims priority to U.S. Provisional Patent Application No. 62/546,640, filed Aug. 17, 2017, both of which are incorporated herein by reference in their entirety.

TECHNICAL FIELD

The present disclosure relates to methods of processing audio signals. In particular, the present disclosure relates to methods of processing audio signals that selectively apply speech enhancement and particularly dialog enhancement to (portions of) the audio signals. The present disclosure also relates to corresponding apparatus, such as decoders, for example. The present disclosure is particularly, though not exclusively, applicable to the AC-4 codec.

BACKGROUND

State of the art audio codecs, such as AC-4, for example, can use post-processing techniques such as dialog enhancement to boost dialog when it is detected. This dialog enhancement can be guided by dialog enhancement parameters that are provided in the encoded bitstream (e.g. AC-4 bitstream).

However, in some situations simply boosting any dialog may do more harm to the perceived audio quality than it adds to the understandability or intelligibility of dialog. To complicate matters, whether dialog enhancement on the overall is beneficial may also depend on the individual listener (e.g., their hearing abilities), the individual listening conditions, and the complexity of the audio scene in question. Another issue that state-of-the-art dialog enhancement techniques are facing is that the dialog detector (speech detector) may not be fully accurate, which might result in un-boosted dialog and boosted non-dialog, at the cost of understandability of dialog and/or overall perceived audio quality. Also the evaluation of the quality of dialog enhancement, both subjectively and objectively, is a complicated task without universally applicable solution, so that reliable tuning algorithms for dialog enhancement are still wanting.

Thus, there is a need for an improved method and apparatus for processing media content and for applying dialog enhancement. There is further need for such method and apparatus that enable selective application of dialog enhancement.

SUMMARY

According to an aspect of the disclosure, a method of processing an audio signal (e.g., a decoded audio signal, such as an audio signal decoded from a bitstream, for example) is described. The method may be said to be a method of selectively applying speech/dialog enhancement to portions of the audio signal. The method may include obtaining a measure of a cognitive load of a listener that listens to a rendering (e.g., a rendered representation) of the audio signal. The method may further include determining whether speech/dialog enhancement shall be applied based on the obtained measure of the cognitive load. The method may yet further include performing speech/dialog enhancement based on (e.g., in accordance with) the determination. That is, speech/dialog enhancement may be performed only if it is determined that speech/dialog enhancement shall be applied. For example, it may be determined that speech/dialog enhancement shall be applied if the cognitive load of the listener is found to be above a predefined threshold for the cognitive load. Performing speech/dialog enhancement may involve applying speech/dialog enhancement to a portion (e.g., frame) of the audio signal, for example the portion that is currently rendered.

The proposed method is based on the fact that the cognitive load (i.e., how loaded the brain is) of a listener increases if the listener has problems to understand speech/dialog in a portion of rendered audio. Thus, by obtaining a measure of the cognitive load of the listener and selectively applying speech/dialog enhancement in dependence on the measure of the cognitive load, speech/dialog enhancement can be applied in a manner that is specifically tailored to the needs of the listener. That is, speech/dialog enhancement can be applied only when the listener has problems understanding speech/dialog. Moreover, speech/dialog enhancement does not have to rely on potentially inaccurate speech/dialog detection. In consequence, unnecessary speech/dialog enhancement, which could degrade the overall perceived quality of the rendered audio, can be avoided, while it can be ensured that the listener is aided in understanding speech/dialog where this is needed.

In some embodiments, obtaining the measure of the cognitive load may be based on information indicative of a pupil dilation (e.g., pupil diameter) of the listener. Thus, the method may be said to include monitoring the pupil dilation of the listener. In general, obtaining the measure of the cognitive load of the listener may be based on information indicative of a pupil dilation of the listener. As has been found, the pupil dilation (e.g., pupil diameter) of a listener is a good indicator of the cognitive load (i.e., how loaded the brain is) of a listener that listens to an audio signal. Reference in this regard is made for example to Kramer, S. E., Kapteyn, T. S., Festen, J. M., et al., Assessing aspect of hearing handicap by means of pupil dilation, 1997, Audiology 36, 155-164, and to Zekveld, A. A., Kramer, S. E., and Festen, J. M., Pupil Response as an Indication of Effortful Listening: The Influence of Sentence Intelligibility, 2010, Ear & Hearing, Vol. 31 (4), 480-490. However, the measure of the cognitive load can also be based on other techniques such as Electroencephalography, monitoring the body temperature, or a push button that can be actuated by the listener.

In some embodiments, it may be determined that speech/dialog enhancement shall be applied if the pupil dilation (e.g., pupil diameter) of the listener is found to be above a predefined threshold for the pupil dilation.

Typically, if the pupil dilation is above a given threshold, this indicates high cognitive load of the listener, which in turn can be seen as an indication that speech/dialog enhancement shall be applied. This enables selective application of speech/dialog enhancement, specifically tailored to the listener's needs.

In some embodiments, obtaining the measure of the cognitive load may be based on eye-tracking data for the listener. Thus, obtaining the measure of the cognitive load may involve analyzing the eye-tracking data. The eye-tracking data may be data that is obtained by an eye-tracking device, such as an eye-tracking device of a virtual reality (VR) headset (or augmented reality (AR)/mixed AR+VR reality headset) or a TV set with eye tracking, for example. Since eye tracking data is available for many media applications (e.g., for gesture-controlled TV sets or in AR environments, VR environments, and mixed AR+VR environments), this allows for a particularly simple implementation of the proposed method, without incurring the need for additional hardware.

In some embodiments, obtaining the measure of the cognitive load may involve determining information indicative of a pupil dilation (e.g., pupil diameter) of the listener based on the eye-tracking data, for example by analyzing the eye-tracking data. Thus, the method may be said to include monitoring the pupil dilation of the listener. In general, obtaining the measure of the cognitive load of the listener may be based on information indicative of a pupil dilation of the listener.

In some embodiments, the method may further include pre-processing of the eye-tracking data (i.e., a processing of the eye-tracking data before determining information indicative of the pupil dilation based on the eye-tracking data). For example, the pre-processing of the eye-tracking data may involve removing portions of the eye-tracking data that relate to eye blinks. The pre-processing may further involve interpolation and/or smoothing between timings before (e.g., immediately before or a certain time interval before) and after (e.g., immediately after, or a certain time interval after) eye blinks. Thereby, an accuracy of the determination of the pupil dilation can be improved.

In some embodiments, the method may further include applying a heuristic model to the eye-tracking data for determining the cognitive load of the listener. Alternatively, the heuristic model can also be applied to data indicative of the pupil dilation. The heuristic model may evolve over time, for example to adapt to a specific user. Evolution of the heuristic model over time may involve machine learning (learning over time).

In some embodiments, the method may further include receiving side-information (e.g., metadata) associated with the audio signal. The side-information may include information on whether speech/dialog is present in the audio signal. The side-information may be conveyed in a bitstream, i.e., the side-information may be received from the bitstream. Then, the determination of whether speech/dialog enhancement shall be applied may be further based on the received information. The side-information may have been obtained at an encoder performing speech/dialog detection (e.g., in the context of speech/dialog enhancement). For example, it may be determined that speech/dialog enhancement shall be applied for a given portion of the audio signal if the side-information indicates that speech/dialog is present in the given portion of the audio signal and if the measure of the cognitive load for the given portion of the audio signal satisfies a predetermined condition. The predetermined condition may relate to whether the cognitive load for the given portion of the audio signal exceeds a predetermined threshold value (e.g., whether the pupil dilation of the listener is found to be above a predefined threshold). Thereby, applying speech/dialog enhancement can be avoided in situations in which the cognitive load and/or pupil dilation of listener is high for other reasons.

In some embodiments, the determination of whether speech/dialog enhancement shall be applied may be performed for each of a plurality of consecutive portions of the audio signal. The method may further involve smoothing a degree of speech/dialog enhancement between consecutive portions of the audio signal, e.g., by fading in and/or fading out speech/dialog enhancement. Thereby, audible artifacts that might result from abrupt starting or ending speech/dialog enhancement can be avoided.

In some embodiments, the determination of whether speech/dialog enhancement shall be applied may be performed for each of a plurality of channels. For example, the side-information may be channel-specific and may indicate for each channel whether speech/dialog is present.

Another aspect relates to a further method of processing an audio signal (e.g., a decoded audio signal). The method may include obtaining a measure of a cognitive load of a listener that listens to a rendering of the audio signal. The method may further include determining a degree of speech/dialog enhancement (e.g., a magnitude of a gain for speech/dialog enhancement) that shall be applied based on the obtained measure of the cognitive load. The method may yet further include performing speech/dialog enhancement based on the determination. The method may additionally include receiving side-information associated with the audio signal. The side-information may include information on gains for speech/dialog enhancement of the audio signal. For example, the side information may include, for each portion (e.g., frame) of the audio signal, a plurality of gains for speech/dialog enhancement from which a selection can be made. Then, the determination may be further based on the received side-information.

Another aspect relates to a decoder for processing an audio signal (e.g., a decoded audio signal, such as an audio signal decoded from a bitstream, for example). The decoder may include a processor and a memory coupled to the processor. The processor may be adapted to perform the operations outlined in the present disclosure. For example, the memory may store instructions for causing the processor to perform the operations outlined in the present disclosure.

Another aspect relates to a program (software program). The software program may be adapted for execution on a processor and for performing the method steps outlined in the present disclosure when carried out on a computing device.

Another aspect relates to a computer-readable storage medium. The storage medium may include a program (software program) adapted for execution on a processor and for performing the method steps outlined in the present disclosure when carried out on a computing device.

Another aspect relates to a computer program product. The computer program may include executable instructions for performing the operations outlined in the present disclosure when executed on a computer.

According to another aspect, a headset for computer-mediated reality (e.g., AR headset, VR headset, or mixed AR+VR headset) is described. The headset may include a processor and a memory coupled to the processor. The processor may be adapted to obtain eye-tracking data of a wearer of the headset. The processor may be further adapted to determine a measure of a cognitive load of the wearer of the headset based on the eye-tracking data. The processor may be yet further adapted to output an indication of the cognitive load of the wearer of the headset. The indication may be output for example to a decoder for processing an audio signal (e.g., a decoded audio signal, such as an audio signal decoded from a bitstream, for example). The indication may enable the decoder to determine whether speech/dialog enhancement shall be applied to a current portion of an audio signal that is rendered by the decoder. The memory may store instructions for causing the processor to perform the operations according to this aspect.

According to another aspect, a method of operating a headset for computer-mediated reality (e.g., AR headset, VR headset, or mixed AR+VR headset) is described. The method may include obtaining eye-tracking data of a wearer of the headset. The method may further include determining a measure of a cognitive load of the wearer of the headset based on the eye-tracking data. The method may yet further include outputting an indication of the cognitive load of the wearer of the headset.

Another aspect relates to a system of the decoder outlined in the present disclosure and the headset for computer-mediated reality outlined in the present disclosure. In this system, the headset may operate in conjunction (e.g., in cooperation) with the decoder. For example, the headset may transmit information, such as an indication of a cognitive load of a wearer of the headset and/or eye-tracking data, to the decoder.

Another aspect relates to a system of a decoder for processing an audio signal (e.g., a decoded audio signal, such as an audio signal decoded from a bitstream, for example) and a headset for computer-mediated reality (e.g., AR headset, VR headset, or mixed AR+VR headset) operating in conjunction with the decoder. The headset may comprise a processor and a memory coupled to the processor. The processor may be adapted to obtain eye-tracking data of a wearer of the headset. The processor may be further adapted to determine a measure of a cognitive load of the wearer of the headset based on the eye-tracking data. The processor may be yet further adapted to output an indication of the cognitive load of the wearer of the headset to the decoder. The decoder may be adapted to render the audio signal for listening by the wearer of the headset. The decoder may be further adapted to receive the indication of the cognitive load of the wearer of the headset from the headset. The decoder may be further adapted to determine whether speech/dialog enhancement shall be applied based on the indication of the cognitive load of the wearer of the headset. The decoder may be yet further adapted to perform speech/dialog enhancement based on the determination.

According to another aspect, a method of operating a system of a decoder for processing an audio signal (e.g., a decoded audio signal, such as an audio signal decoded from a bitstream, for example) and a headset for computer-mediated reality (e.g., AR headset, VR headset, or mixed AR+VR headset) operating in conjunction with the decoder is described. The method may include, at the headset, obtaining eye-tracking data of a wearer of the headset. The method may further include, at the headset, determining a measure of a cognitive load of the wearer of the headset based on the eye-tracking data. The method may yet further include, at the headset, outputting an indication of the cognitive load of the wearer of the headset to the decoder. The method may include, at the decoder, rendering the audio signal for listening by the wearer of the headset. The method may further include, at the decoder, receiving the indication of the cognitive load of the wearer of the headset from the headset. The method may further include, at the decoder, determining whether speech/dialog enhancement shall be applied based on the indication of the cognitive load of the wearer of the headset. The method may yet further include, at the decoder, performing speech/dialog enhancement based on the determination.

It should be noted that the methods and apparatus including its preferred embodiments as outlined in the present disclosure may be used stand-alone or in combination with the other methods and systems described in this disclosure. Furthermore, all aspects of the methods and apparatus outlined in the present disclosure may be arbitrarily combined. In particular, the features of the claims may be combined with one another in an arbitrary manner. Any statements made with regard to a given method are understood to likewise apply to a corresponding apparatus, and vice versa, and repetitions of such statements may be omitted for reasons of conciseness.

BRIEF DESCRIPTION OF THE DRAWINGS

Example embodiments of the present disclosure are explained below with reference to the accompanying drawings, wherein identical reference numerals indicate like or similar elements, and wherein.

DETAILED DESCRIPTION

Figure 1:
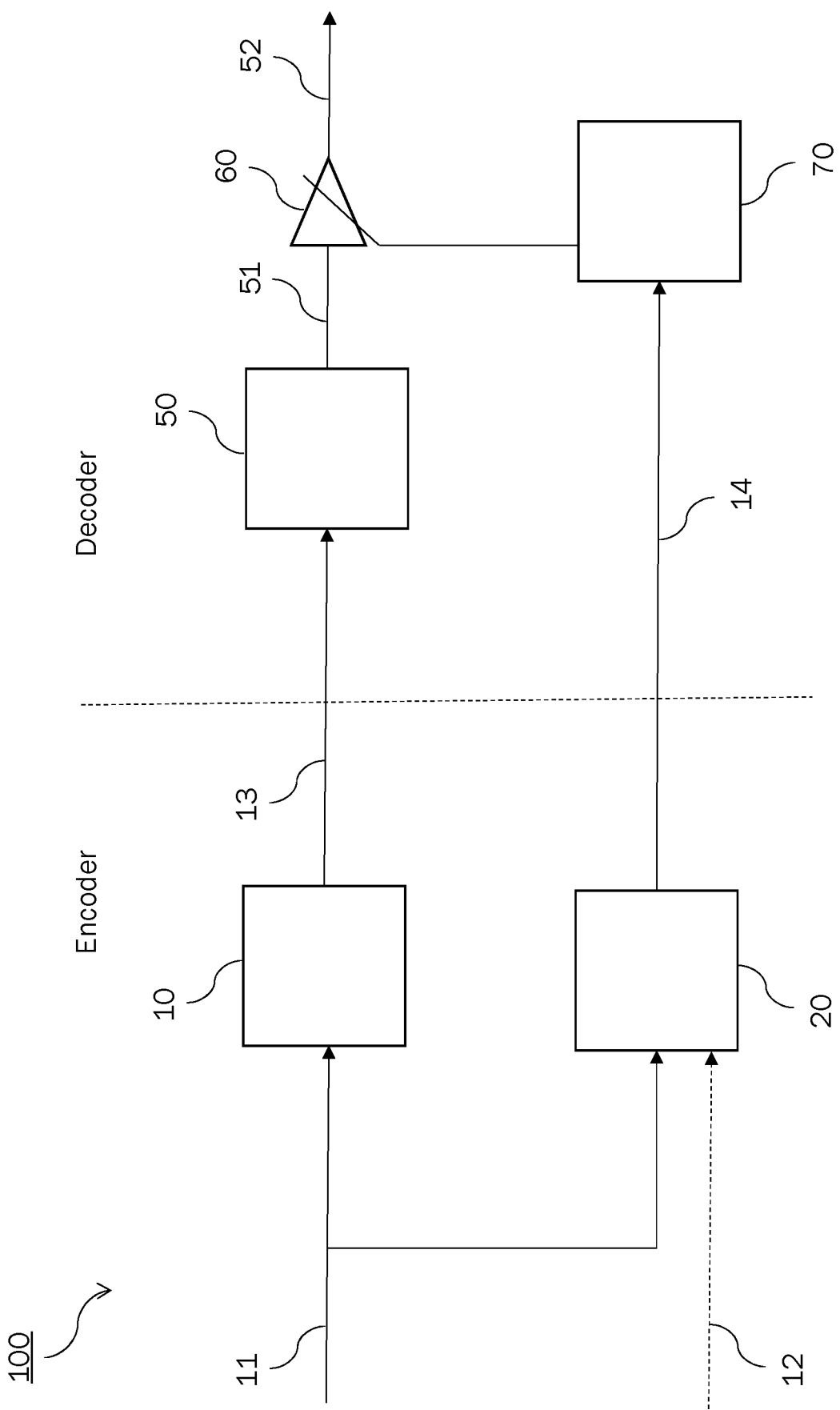
FIG. 1 schematically illustrates an example of an encoding/decoding environment in which speech/dialog enhancement may be applied, FIG. 2 schematically illustrates an example of an encoding/decoding environment according to embodiments of the disclosure.

FIG. 1 schematically illustrates an example of an encoding/decoding environment 100 in which speech/dialog enhancement may be applied. The environment can be seen as being split into an encoder side (to the left of the dashed vertical line) and a decoder side (to the right of the dashed vertical line).

On the encoder side, an encoder (e.g., core encoder) 10 receives input audio (input audio signal) 11. The input audio 11 may be non-enhanced audio, such as audio to which speech/dialog enhancement has not been applied. The input audio 11 is also provided to a speech/dialog enhancement analysis block 20. Optionally, separate speech/dialog tracks (separate speech/dialog channels, separate speech/dialog stems) 12 may be provided to the speech/dialog enhancement analysis block 20 as well. The separate speech/dialog tracks 12 may be in alignment (time alignment) with the input audio 11. The encoder 10 encodes the input audio 11 and outputs encoded audio 13. The encoded audio 13 may be provided to the decoder side. As an intermediate step, the encoded audio 13 may be stored on a storage medium. The speech/dialog enhancement analysis block 20 analyzes the input audio 11 and/or the separate speech/dialog tracks 12. Based on this analysis, the speech/dialog enhancement analysis block 20 determines whether speech/dialog is present for each given portion (e.g., frame) of the input audio 11. The speech/dialog enhancement analysis block 20 may further determine parameters for speech/dialog enhancement of respective portions of the input audio 11. Based on these determinations, the speech/dialog enhancement analysis block 20 outputs side-information 14 (e.g., dedicated side-information for speech/dialog enhancement) that includes an indication (e.g., flag) for each portion of the input audio 11 of whether the respective portion includes speech/dialog. The side-information 14 may further include the parameters for speech/dialog enhancement. These parameters may provide the decoder side with instructions on how to apply the speech/dialog enhancement for a given portion of the audio.

On the decoder side, a decoder (e.g., core decoder) 50 receives the encoded audio 13. The decoder 50 decodes the encoded audio 13 and outputs decoded audio 51. A speech/dialog enhancement block (speech/dialog synthesis block) 70 receives the side-information 14 and boosts portions of the decoded audio 51 by means of a gain unit (booster) 60. The speech/dialog enhancement block 70 controls the gain unit 60 in accordance with the side-information 14, i.e., applies speech/dialog enhancement to those portions of the audio that are flagged as including speech/dialog by the side-information 14. As noted above, the side-information 14 may further specify the manner in which speech/dialog enhancement is applied, e.g., a gain that is applied to the respective portion of the audio. The gain unit 60 outputs output audio 52 that may be rendered to one or more speakers for listening.

Both the encoder-side processing and the decoder-side processing may be performed on a channel-by-channel basis, i.e., for each of a plurality of channels. Speech/dialog enhancement may be only applied to those channels (and to those portions of the audio) that include speech/dialog.

Thus, in the encoding/decoding environment 100, speech/dialog enhancement is performed (i.e., a boost is applied to the decoded audio 51) whenever speech/dialog is detected in the relevant portion of the audio. Whether or not this speech/dialog enhancement improves the perceived audio quality may depend on the individual listener, the listening conditions, or the relevant audio scene.

Methods and apparatus according to the present disclosure are based on the finding that the pupil dilation of a human's eye is a measure of how loaded the brain is (i.e., a measure of a cognitive load). Methods and apparatus according to the present disclosure are further based on the finding that a listener's cognitive load increases under difficult speech reception conditions, i.e., if the listener has problems understanding speech. In other words, a listener's increase in cognitive effort is reflected in an increased pupil dilation (e.g., pupil diameter). Based on these finding, the present disclosure proposes to use a listener's pupil dilation (which reflects the listener's cognitive load) to control speech/dialog enhancement (e.g., boosting of speech/dialog). Information on the pupil dilation may be obtained from an eye-tracking device that operates in conjunction with an audio decoder, for example.

Figure 2:
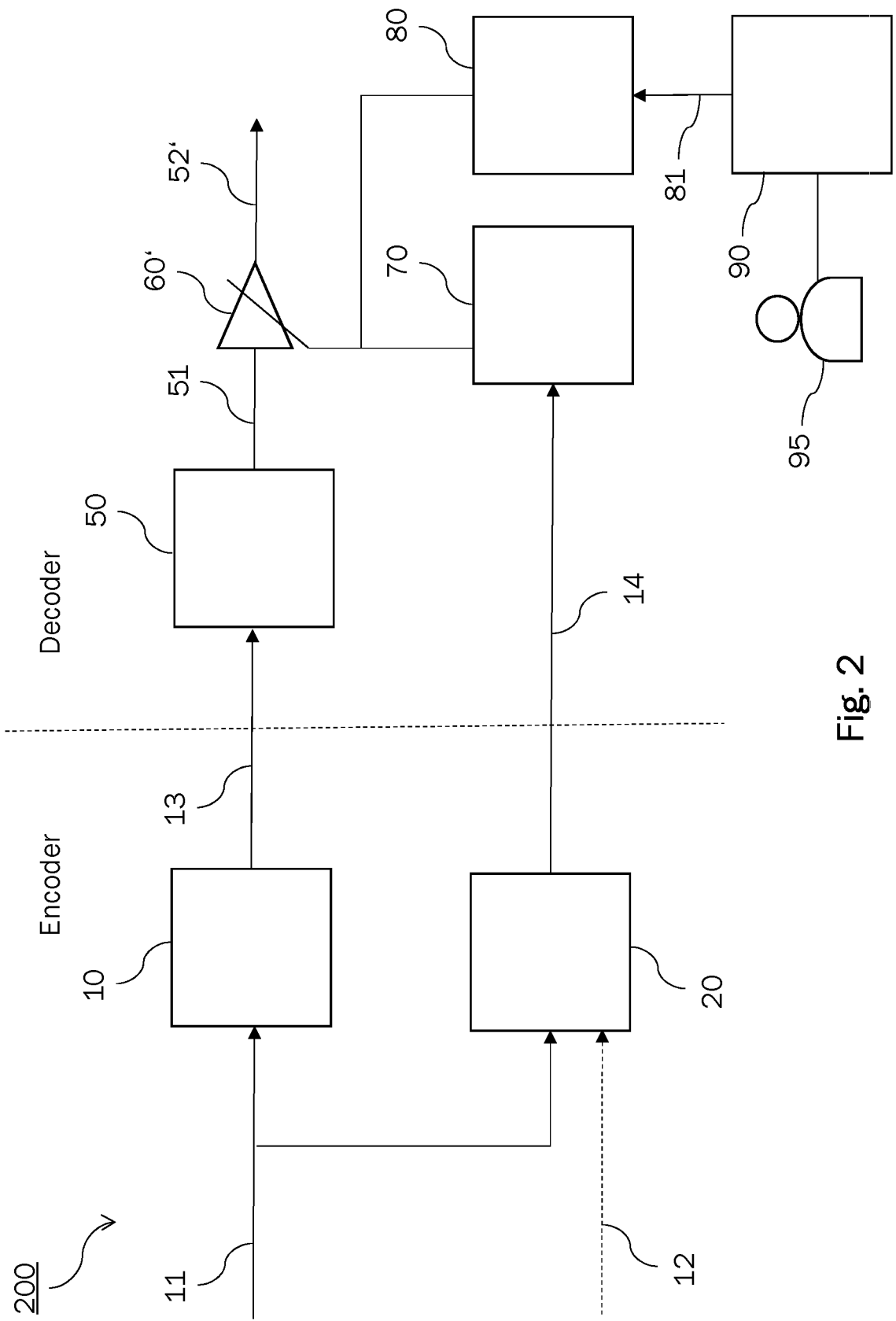

An example of an encoding/decoding environment 200 according to embodiments of the disclosure is schematically illustrated in FIG. 2. The encoder side (to the left of the dashed vertical line) is identical to the encoder side in the encoder/decoder environment 100 of FIG. 1. The decoder side (to the right of the dashed vertical line) differs from the decoder side in the encoder/decoder environment 100 of FIG. 1 in that a gain unit 60' (a modified gain unit) is provided that is controlled by the speech/dialog enhancement block 70 and a cognitive load determination block 80. The gain unit 60' outputs (modified) output audio 52'. The cognitive load determination block 80 receives eye-tracking data 81 from an eye-tracking device 90. The eye-tracking data may be time series data that indicates, for each of a plurality of consecutive instances of time, one or more characteristics (parameters) of the eye of a user 95. The eye-tracking device 90 may be in visual contact with the user 95 and may be part of, for example, a headset for computer-mediated reality (e.g., AR headset, VR headset, or mixed AR+VR headset) or a TV set having an eye-tracking capability. The user 95 may listen to a rendering of the output audio 52'. The cognitive load determination block 80 determines a cognitive load of the user 95, by analyzing the eye-tracking data. For example, the cognitive load determination block 80 may analyze the eye-tracking data to determine a pupil dilation (e.g., pupil diameter) of the user 95, and may determine the cognitive load of the user 95 based on the determined pupil dilation. The gain unit 60' is controlled by the speech/dialog enhancement block 70 and the cognitive load determination unit 80. For example, speech/dialog enhancement (by boosting the respective portion of the audio) may be applied if the side-information 14 indicates that speech/dialog is present, and if the determined cognitive load indicates that the user 95 has problems understanding said speech/dialog. Alternatively, speech/dialog enhancement may be applied based on the determined cognitive load alone, i.e., without reference to the side-information 14, or at least without reference to the indication of whether speech/dialog is present in the respective portion of the audio.

Broadly speaking, the proposed methods and apparatus selectively apply speech/dialog enhancement (i.e., selectively boost or do not boost speech/dialog) based on a listener's effort in understanding the speech/dialog.

Figure 3:
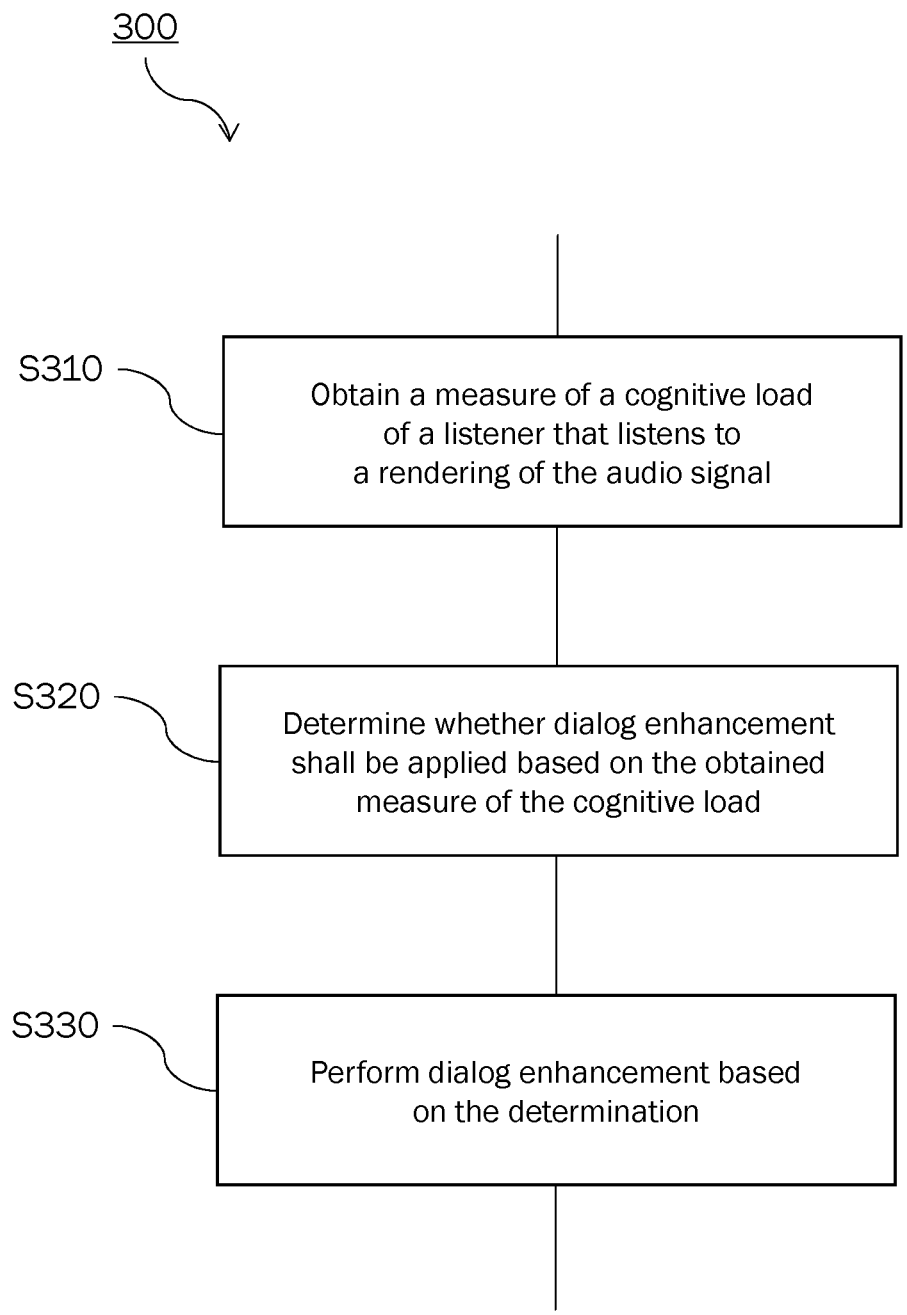
FIG. 3 is a flow chart schematically illustrating an example of a method according to embodiments of the disclosure.

FIG. 3 illustrates an example of a method 300 of processing an audio signal (e.g., a decoded audio signal, such as an audio signal decoded from a bitstream, for example) and for selectively applying speech/dialog enhancement to (portions of) the audio signal. The method 300 may be performed by a decoder, for example. The method may comprise an initial step of decoding the audio signal from a bitstream.

At step S310, a measure of a cognitive load of a listener that listens to a rendering of the audio signal (e.g., that listens to a rendered representation of the audio signal) is obtained. The measure of the cognitive load can be obtained (e.g., determined) based on information indicative of a pupil dilation (e.g., pupil diameter) of an eye of the listener. Accordingly, step S310 may be said to be a step of monitoring a pupil dilation of the listener. In general, obtaining the measure of the cognitive load may be based on information indicative of a pupil dilation of the listener.

In certain implementations, obtaining the measure of the cognitive load may be based on eye-tracking data for the listener. For example, the eye-tracking data may be used for determining information indicative of the pupil dilation of the listener. This may involve analyzing the eye-tracking data. The eye-tracking data may be obtained by an eye-tracking device, such as an eye-tracking device of a headset for computer-mediated reality (e.g., AR headset, VR headset, or mixed AR+VR headset) with eye tracking, or a TV set with eye tracking. Suitable eye-tracking devices and consumer devices capable of eye tracking (e.g., headsets for computer-mediated reality, TV sets) are commercially available. In the context of the present disclosure, a headset for computer-mediated reality is understood to be any headset that can present visual information to a wearer of the headset to overlay or replace the wearer's view of a real scene.

The eye-tracking data may be analyzed using a heuristic model for determining the cognitive load of the listener. For example, the heuristic model may be applied to the information indicative of the pupil dilation, to determine the cognitive load of the listener. The heuristic model may evolve over time. Evolution over time may involve machine learning (learning over time). For example, the heuristic model may be adapted to a specific user (listener), and may evolve over time to improve the adaptation.

In order to be able to obtain more accurate information on the pupil dilation (and thereby, more accurate information on the cognitive load), the eye-tracking data may be preprocessed before obtaining the information indicative of the pupil dilation and/or the measure of the cognitive load of the listener (i.e., before analyzing the eye-tracking data). Pre-processing of the eye-tracking data may involve removing portions of the eye-tracking data that relate to eye blinks (e.g., removing eye blinks). Eye blinks may be detected by an automatic classification algorithm, for example, or using a heuristic measure. When using the heuristic measure, an eye blink may be detected, for example, if the pupil dilation is below a certain threshold. If an eye blink is detected, a portion of the eye-tracking data relating to the detected eye blink, optionally together with portions relating to a certain interval of time before and after the detected eye blink may be removed from the eye-tracking data. The pre-processing may further include interpolation between timings before and after the detected (or removed) eye blink (e.g., between a latest timing before a time interval relating to the removed portion of the eye-tracking data and an earliest timing after this time interval). The pre-processing may further include smoothing (e.g., over time) of the eye-tracking data after removing eye blinks (or after subsequent interpolation).

At step S320, it is determined whether speech/dialog enhancement shall be applied based on the obtained measure of the cognitive load. For example, it may be determined that speech/dialog enhancement shall be applied if the cognitive load of the listener is found to be above a predefined threshold for the cognitive load. Likewise, it may be determined that speech/dialog enhancement shall be applied if the pupil dilation of the listener is found to be above a predefined threshold for the pupil dilation. The rationale behind this determination is that a high cognitive load (which would be indicated by an enlarged pupil dilation) can be indicative of the listener having problems understanding speech or speech/dialog.

In certain implementations, the method 300 may further include receiving side-information (metadata) associated with the audio signal, wherein the side-information includes information on whether speech/dialog is present in the audio signal. That is, the side-information may include, for each of a plurality of consecutive portions (e.g., frames) of the audio signal, and indication (e.g., flag) of whether that portion of the audio signal contains speech/dialog. The side-information may have been obtained at an encoder for enabling or facilitating speech/dialog enhancement at the decoder. In this case, the determination at step S320 may be further based on the side-information (e.g., based on the aforementioned indication of whether speech/dialog is present). For example, it may be determined that speech/dialog enhancement shall be applied for a given portion (e.g., frame) of the audio signal if the side-information indicates that speech/dialog is present in the given portion of the audio signal and if the measure of the cognitive load for the given portion of the audio signal satisfies a predetermined condition. The predetermined condition may be satisfied if the cognitive load for the given portion of the audio signal exceeds a predetermined threshold value, for example. Likewise, the predetermined condition may be deemed satisfied if the pupil dilation of the listener is found to be above a predefined threshold.

At step S330, speech/dialog enhancement is performed based on the determination (e.g., in accordance with the determination). The speech/dialog enhancement may be applied to a current portion (e.g., frame) of the audio signal (a portion that is currently rendered), or to the next portion of the audio signal. In general, speech/dialog enhancement may be selectively performed for each of a plurality of successive portions (e.g., frames) of the audio signal. The method may further comprise rendering the audio signal.

As indicated above, the side-information may include parameters for speech/dialog enhancement. These parameters may provide the decoder side with instructions on how to apply the speech/dialog enhancement. In certain implementations, the side-information may indicate, for each portion of the audio signal that contains speech/dialog, a gain for application to the respective portion of the audio. This gain then could be applied at step S330 if it is determined at step S320 that speech/dialog enhancement shall be applied (i.e., the speech/dialog enhancement may be performed in accordance with the parameters for speech/dialog enhancement included in the side-information for the relevant portion of the audio signal). The side-information may also contain more than one gain for each portion of the audio signal that contains speech/dialog. Then, if speech/dialog enhancement is performed at step S330, selection among the more than one gain can be made based on the measure of the cognitive load. For example, a first gain may be selected and applied if it is determined at step S320 that speech/dialog enhancement shall be applied (i.e., if the measure of the cognitive load exceeds the predefined threshold value) but the measure of the cognitive load is still found to be below a predefined second threshold (that is larger than the predefined threshold). A second gain (that is larger than the first gain) could be applied if the measure of the cognitive load is found to be above the predefined second threshold. It is understood that this scheme can be extended to an arbitrary number of gains and predefined thresholds.

In general, a degree of speech/dialog enhancement that is performed at step S330 (e.g., a magnitude of a gain that is applied at this step) may depend on the measure of the cognitive load of the listener.

The steps of method 300 may be performed for each of a plurality of consecutive portions (e.g., frames) of the audio signal. For example, the determination of whether speech/dialog enhancement shall be applied may be performed for each of a plurality of consecutive portions of the audio signal, and the speech/dialog enhancement may be selectively applied to each portion of the audio signal in accordance with a result of the determination for that portion of the audio signal. In this case, the method may further include a step of smoothing a degree of the speech/dialog enhancement (e.g., a gain that is applied when boosting the speech/dialog) between consecutive portions of the audio signal. Further, the steps of method 300 may be performed for each of a plurality of channels that form the audio signal.

As noted above, method 300 may be performed by a decoder. Such decoder may comprise a processor and a memory coupled to the processor. The processor may be adapted to perform each of steps S310, S320, and S330 described above. The memory may store respective instructions for causing the processor to perform these steps.

Figure 4:
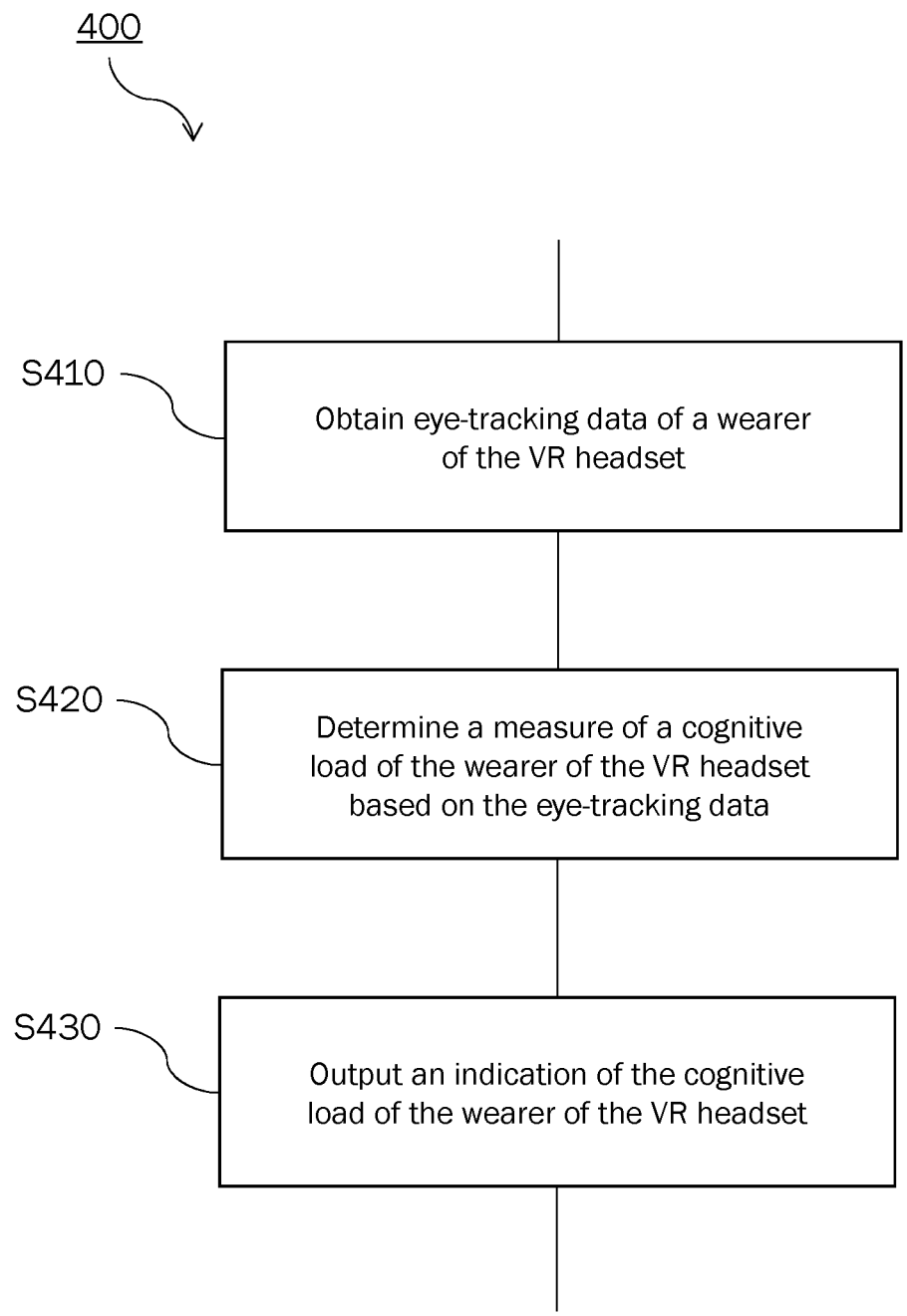
FIG. 4 is a flow chart schematically illustrating another example of a method according to embodiments of the disclosure.

In certain implementations, the decoder may operate in conjunction (e.g., in cooperation) with a headset for computer-mediated reality (e.g., AR headset, VR headset, or mixed AR+VR headset) that obtains eye-tracking data. The headset for computer-mediated reality may be seen as a non-limiting example of a device for obtaining eye-tracking data. FIG. 4 illustrates an example of a method 400 of operating such headset. Without intended limitation, the remainder of the present disclosure makes reference to a VR headset. It is understood that any other headset for computer-mediated reality could be used as well in the embodiments described below.

At step S410, eye-tracking data of a wearer of the VR headset is obtained. This may be done using an eye-tracking device of the VR headset.

At step S420, a measure of a cognitive load of the wearer of the VR headset is determined based on the eye-tracking data. This may be done in the manner described with reference to step S310 above. The wearer of the VR headset is assumed to be the listener that listens to the rendering of the audio signal.

At step S430, an indication of the cognitive load of the wearer of the VR headset is output. The indication of the cognitive load of the wearer of the VR headset may be output to the decoder. The output indication may enable the decoder to determine whether speech/dialog enhancement shall be applied to a current portion of an audio signal that is rendered by the decoder, for example in the manner described with reference to step S320 above.

In alternative implementations, the VR headset (as an example of a headset for computer-mediated reality, or more generally, an example of device for obtaining eye-tracking data) may directly output the eye-tracking data to the decoder. The decoder may then determine the measure of the cognitive load of the wearer of the VR headset, for example in the manner described with reference to step S310 above.

Steps S410 to S430 may be continuously performed. For example, each of these steps may be performed once every given time interval. For example, each of these steps may be performed once per portion (e.g., frame) of the audio signal.

A corresponding VR headset may comprise a processor and a memory coupled to the processor. The processor may be adapted to perform each of steps S410, S420, and S430 described above. The memory may store respective instructions for causing the processor to perform these steps. The VR headset may further comprise an optical device (e.g., a camera) for capturing a visual representation of the wearer's eye or eyes, from which the eye-tracking data can be derived.

Figure 5:
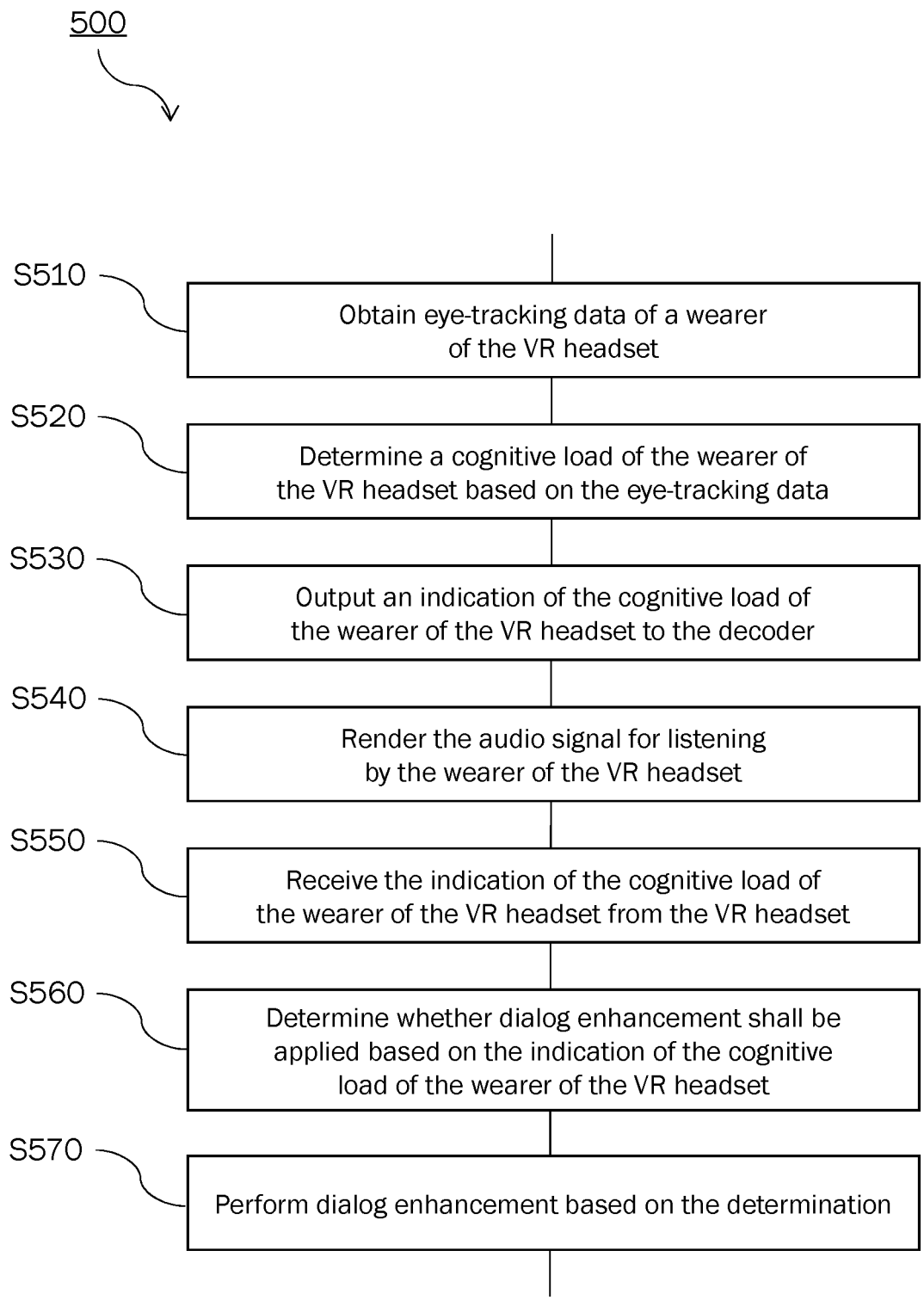
FIG. 5 is a flow chart schematically illustrating yet another example of a method according to embodiments of the disclosure.

A decoder and a VR headset (as an example of a headset for computer-mediated reality, or more generally, an example of device for obtaining eye-tracking data) operating in conjunction with the decoder may form a system for processing the audio signal. FIG. 5 illustrates an example of a method 500 of operating such system.

At step S510, eye-tracking data of a wearer of the VR headset is obtained at the VR headset. This may be performed in the manner described above with reference to step S410.

At step S520, a measure of a cognitive load of the wearer of the VR headset is determined at the VR headset based on the eye-tracking data. This may be performed in the manner described above with reference to step S420 (or step S310).

At step S530, an indication of the cognitive load of the wearer of the VR headset to the decoder is output by the VR headset. This may be performed in the manner described above with reference to step S430.

Steps S510 to S530 may be continuously performed. Likewise, steps S540 to S560 described below may be continuously performed. For example, each of these steps may be performed once every given time interval. For example, each of these steps may be performed once per portion (e.g., frame) of the audio signal.

At step S540, the audio signal is rendered by the decoder for listening by the wearer of the VR headset. As noted above, this may be a continuous process.

At step S550, the indication of the cognitive load of the wearer of the VR headset from the VR headset is received at the decoder. Notably, steps S540 and S550 may be performed in any order.

At step S560, it is determined by the decoder whether speech/dialog enhancement shall be applied based on the indication of the cognitive load of the wearer of the VR headset. This may be performed in the manner described above with reference to step S320. The determination may be further based on side-information associated with the audio signal, as described above.

At step S570, speech/dialog enhancement is performed by the decoder based on (e.g., in accordance with) the determination. This may be performed in the manner described above with reference to step S330.

In an alternative implementation, the VR headset may directly transmit the eye-tracking data to the decoder. In this case, step S520 would be performed at the decoder, i.e., the decoder would determine the measure of the cognitive load of the wearer of the VR headset based on the eye-tracking data, for example in the manner described above with reference to step S310.

A decoder for use in this system may comprise a processor and a memory coupled to the processor. The processor may be adapted to perform each of steps S540, S550, S560, and S570 described above. The memory may store respective instructions for causing the processor to perform these steps.

A VR headset for use in the system may comprise a processor and a memory coupled to the processor. The processor may be adapted to perform each of steps S510, S520, and S530 described above. The memory may store respective instructions for causing the processor to perform these steps. The VR headset may further comprise an optical device (e.g., a camera) for capturing a visual representation of the wearer's eye or eyes, from which the eye-tracking data can be derived.

It should be noted that the description and drawings merely illustrate the principles of the proposed methods and apparatus. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the proposed methods and apparatus and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The methods and apparatus described in the present disclosure may be implemented as software, firmware and/or hardware. Certain components may e.g. be implemented as software running on a digital signal processor or microprocessor. Other components may e.g. be implemented as hardware and or as application specific integrated circuits. The signals encountered in the described methods and apparatus may be stored on media such as random-access memory or optical storage media. They may be transferred via networks, such as radio networks, satellite networks, wireless networks or wireline networks, e.g. the Internet.

Various aspects of the present invention may be appreciated from the following enumerated example embodiments (EEEs):

EEE 1. A method of processing a decoded audio signal, the method comprising:
obtaining a measure of a cognitive load of a listener that listens to a rendering of the audio signal;
determining whether speech/dialog enhancement shall be applied based on the obtained measure of the cognitive load; and
performing speech/dialog enhancement based on the determination.

EEE 2. The method of EEE 1, further comprising receiving side-information associated with the audio signal, the side-information including information on whether speech/dialog is present in the audio signal,
wherein the determination is further based on the received side-information.

EEE 3. The method of EEE 2, wherein it is determined that speech/dialog enhancement shall be applied for a given portion of the audio signal if the side-information indicates that speech/dialog is present in the given portion of the audio signal and if the measure of the cognitive load for the given portion of the audio signal satisfies a predetermined condition.

EEE 4. The method of EEE 1, wherein it is determined that speech/dialog enhancement shall be applied if the cognitive load of the listener is found to be above a predefined threshold for the cognitive load.

EEE 5. The method of EEE 1, wherein obtaining the measure of the cognitive load is based on information indicative of a pupil dilation of the listener.

EEE 6. The method of EEE 5, wherein it is determined that speech/dialog enhancement shall be applied if the pupil dilation of the listener is found to be above a predefined threshold for the pupil dilation.

EEE 7. The method of EEE 1, wherein obtaining the measure of the cognitive load is based on eye-tracking data for the listener.

EEE 8. The method of EEE 7, wherein obtaining the measure of the cognitive load involves determining information indicative of a pupil dilation of the listener based on the eye-tracking data.

EEE 9. The method of EEE 7, further comprising pre-processing of the eye-tracking data.

EEE 10. The method of EEE 9, wherein pre-processing the eye-tracking data involves removing portions of the eye-tracking data that relate to eye blinks.

EEE 11. The method of EEE 7, further comprising applying a heuristic model to the eye-tracking data for determining the cognitive load of the listener.

EEE 12. The method of EEE 1, wherein the determination of whether speech/dialog enhancement shall be applied is performed for each of a plurality of consecutive portions of the audio signal.

EEE 13. The method of EEE 1, wherein the determination of whether speech/dialog enhancement shall be applied is performed for each of a plurality of channels.

EEE 14. A method of processing a decoded audio signal, the method comprising:
obtaining a measure of a cognitive load of a listener that listens to a rendering of the audio signal;
determining a degree of speech/dialog enhancement that shall be applied based on the obtained measure of the cognitive load; and
performing speech/dialog enhancement based on the determination.

EEE 15. The method of EEE 14, further comprising receiving side-information associated with the audio signal, the side-information including information on gains for speech/dialog enhancement of the audio signal,
wherein the determination is further based on the received information.

EEE 16. A decoder for processing an audio signal, the decoder comprising a processor and a memory coupled to the processor, wherein the processor is adapted to perform the operations of EEE 1.

EEE 17. A program for causing a computer to perform the operations of EEE 1 when performed on the computer.

EEE 18. A computer-readable storage medium storing a program for causing a computer to perform the operations of EEE 1 when performed on the computer.

EEE 19. A headset for computer-mediated reality comprising a processor and a memory coupled to the processor, wherein the processor is adapted to:
obtain eye-tracking data of a wearer of the headset;
determine a measure of a cognitive load of the wearer of the headset based on the eye-tracking data; and
output an indication of the cognitive load of the wearer of the headset.

EEE 20. A method of operating a headset for computer-mediated reality, the method comprising:
obtaining eye-tracking data of a wearer of the headset;
determining a measure of a cognitive load of the wearer of the headset based on the eye-tracking data; and
outputting an indication of the cognitive load of the wearer of the headset.

EEE 21. A system of the decoder of EEE 16 and the headset for computer-mediated reality of EEE 19, the headset operating in conjunction with the decoder.

EEE 22. A system of a decoder for processing an audio signal and a headset for computer-mediated reality operating in conjunction with the decoder, the headset comprising a processor and a memory coupled to the processor,
wherein the processor is adapted to:
obtain eye-tracking data of a wearer of the headset;
determine a measure of a cognitive load of the wearer of the headset based on the eye-tracking data; and
output an indication of the cognitive load of the wearer of the headset to the decoder; and
wherein the decoder is adapted to:
render the audio signal for listening by the wearer of the headset;
receive the indication of the cognitive load of the wearer of the headset from the headset;
determine whether speech/dialog enhancement shall be applied based on the indication of the cognitive load of the wearer of the headset; and
perform speech/dialog enhancement based on the determination.

EEE 23. A method of operating a system of a decoder for processing an audio signal and a headset for computer-mediated reality operating in conjunction with the decoder,
wherein the method comprises, at the headset:
obtaining eye-tracking data of a wearer of the headset;
determining a measure of a cognitive load of the wearer of the headset based on the eye-tracking data;
outputting an indication of the cognitive load of the wearer of the headset to the decoder; and
the method further comprises, at the decoder:
rendering the audio signal for listening by the wearer of the headset;
receiving the indication of the cognitive load of the wearer of the headset from the headset;

determining whether speech/dialog enhancement shall be applied based on the indication of the cognitive load of the wearer of the headset; and performing speech/dialog enhancement based on the determination.

The invention claimed is:

1. A method of processing an audio signal, the method comprising:
with a decoder,
decoding a coded bitstream including a plurality of frames having respective portions of the audio signal and further including metadata associated with the audio signal, the metadata including, for each frame of the plurality of frames, a respective indication of whether speech is present therein and, for each frame of the plurality of frames that includes speech, a respective set of parameters for speech enhancement;
receiving eye-tracking data of a wearer of a headset for computer-mediated reality;
determining, as a time series, a measure of a cognitive load of the wearer of the headset based on the eye-tracking data; and
enhancing the audio signal by selectively applying speech enhancement using the respective set of parameters for the speech enhancement to each portion of the audio signal for which the measure satisfies a predetermined condition and the respective indication indicates that the speech is present; and
with the headset,
rendering the enhanced audio signal for listening by the wearer of the headset.

2. The method of claim 1, wherein the respective set of parameters includes information on gains for the selectively applied speech enhancement.

3. The method of claim 1,
wherein the respective indication is channel-specific; and
wherein the speech enhancement is selectively performed for a plurality of channels of a frame based on the channel-specific indication.

4. The method of claim 1, wherein the speech enhancement is applied when the measure of the cognitive load is found to be above a predefined threshold for the cognitive load.

5. The method of claim 1, wherein the determining is based on information indicative of a pupil dilation of the wearer.

6. The method of claim 5, wherein it is determined that speech enhancement shall be applied if the pupil dilation of the wearer is found to be above a predefined threshold for the pupil dilation.

7. The method of claim 1, wherein the determining involves determining information indicative of a pupil dilation of the wearer based on the eye-tracking data.

8. The method of claim 1, further comprising applying a heuristic model to the eye-tracking data for determining the cognitive load of the wearer.

9. The method of claim 1, further comprising pre-processing of the eye-tracking data.

10. The method of claim 9, wherein the pre-processing of the eye-tracking data involves removing portions of the eye-tracking data that relate to eye blinks.

11. The method of claim 1, further comprising boosting each portion of the audio signal for which the measure satisfies the predetermined condition and the respective indication indicates that speech is present using one or more gain values specified in the respective set of parameters.

12. The method of claim 1, further comprising receiving the coded bitstream via a network connection from an encoder, a memory, or an optical storage medium.

13. A headset for computer-mediated reality comprising a processor and a memory coupled to the processor, wherein the processor is configured to:
decode a coded bitstream including a plurality of frames having respective portions of an audio signal and further including metadata associated with the audio signal, the metadata including, for each frame of the plurality of frames, a respective indication of whether speech is present therein and, for each frame of the plurality of frames that includes speech, a respective set of parameters for speech enhancement;
receive eye-tracking data of a wearer of the headset;
determine, as a time series, a measure of a cognitive load of the wearer of the headset based on the eye-tracking data;
enhance the audio signal by selectively applying speech enhancement using the respective set of parameters for the speech enhancement to each portion of the audio signal for which the measure satisfies a predetermined condition and the respective indication indicates that the speech is present; and
cause the headset to render the enhanced audio signal for listening by the wearer of the headset.

14. The headset of claim 13, wherein the respective set of parameters includes information on gains for the selectively applied speech enhancement.

15. The headset of claim 13,
wherein the respective indication is channel-specific; and
wherein the speech enhancement is selectively performed for each of a plurality of channels of a frame based on the channel-specific indication.

16. The headset of claim 13,
wherein the processor is further configured to cause a gain unit to boost each portion of the audio signal for which the measure satisfies the predetermined condition and the respective indication indicates that speech is present based on one or more gain values specified in the respective set of parameters.

17. The headset of claim 13, wherein the headset is configured to receive the coded bitstream via a network connection from an encoder, a memory, or an optical storage medium.

* * * * *